United States Patent [19]

Hubble, III et al.

[11] Patent Number: 5,272,493
[45] Date of Patent: Dec. 21, 1993

[54] METHOD AND APPARATUS FOR REGISTRATION OF SEQUENTIAL IMAGES IN A SINGLE PASS, MULTI-LED PRINTBAR PRINTER

[75] Inventors: Fred F. Hubble, III, Rochester; Thomas J. Hammond, Penfield; James P. Martin, Rochester, all of N.Y.

[73] Assignee: Xerox Corporation, Stamford, Conn.

[21] Appl. No.: 862,150

[22] Filed: Apr. 2, 1992

[51] Int. Cl.$^5$ .................. G01D 15/14; G01D 9/42; G01D 15/06
[52] U.S. Cl. .................. 346/160; 346/1.1; 346/107 A; 346/107 R; 346/157
[58] Field of Search .................. 346/107 A, 157, 160, 346/1.1, 108, 107 R

[56] References Cited

U.S. PATENT DOCUMENTS

| | | | |
|---|---|---|---|
| 4,602,262 | 7/1986 | Milligan et al. | 346/160 |
| 4,660,059 | 4/1987 | O'Brien | 346/157 |
| 4,743,927 | 5/1988 | Sasaki | 346/160 |
| 4,829,326 | 5/1989 | Emmett et al. | 346/157 |
| 4,833,503 | 5/1989 | Snelling | 355/259 |
| 4,912,491 | 3/1990 | Hoshino et al. | 346/160 |
| 4,965,597 | 10/1990 | Ohigashi et al. | 346/157 |
| 5,040,003 | 8/1991 | Willis | 346/157 |
| 5,121,145 | 6/1992 | Buch et al. | 346/155 |
| 5,153,604 | 10/1992 | Tutiyasu | 346/1.1 |

Primary Examiner—Benjamin R. Fuller
Assistant Examiner—Randy W. Gibson

[57] ABSTRACT

A precision belt hole sensor and associated conditioning circuitry provides precise trigger signals that enable synchronous printing in a color printer. An image bar recording system, which, in a preferred embodiment, utilizes a plurality of LED image bars, forms a plurality of latent images on a moving photoreceptor which may subsequently be developed in different colors. A pair of sensors associated with each printbar views illuminated pixels at the end of a printbar, through a pair of oppositely aligned photoreceptor holes. The signals detected by the sensor are amplified and processed to provide inputs to a comparitor circuit which generates an output signal at a time which precisely defines the passage of the trailing edge of the hole, past the sensors. The signal from the comparitor is used to accomplish skew registration of the printbar and to provide sync signals to enable precise formation of the leading edge of the associated image frame.

4 Claims, 8 Drawing Sheets

METHOD AND APPARATUS FOR REGISTRATION OF SEQUENTIAL IMAGES IN A SINGLE PASS, MULTI-LED PRINTBAR PRINTER

BACKGROUND OF THE INVENTION AND MATERIAL DISCLOSURE STATEMENT

The present invention relates to registration of plural image exposures formed on a photoreceptor belt in a single pass by a plurality of LED printbars and, more particularly, to improvements in registration by use of high precision, belt hole sensors.

Image printbars used in xerographic recording systems are well known in the art. The printbar generally consists of a linear array of a plurality of discrete light emitting sources. Light emitting diode (LED) arrays are preferred for many recording applications. In order to achieve high resolution, a large number of light emitting diodes, or pixels, are arranged in a linear array on a common substrate. Each LED in the linear array is used to expose a corresponding area on a moving photoreceptor to an exposure value defined by the video data information applied to the drive circuits of the printbars. The photoreceptor is advanced in the process direction to provide a desired image by the formation of sequential scan lines.

In one embodiment of a color xerographic printer, a plurality of LED printbars are positioned adjacent to a photoreceptor belt surface and selectively energized to create successive image exposures. If two bars are used, the system typically provides one highlight color and one black color. For full color, four bars are used, one for each of the three basic colors and a fourth printbar for black images.

Figure 1:
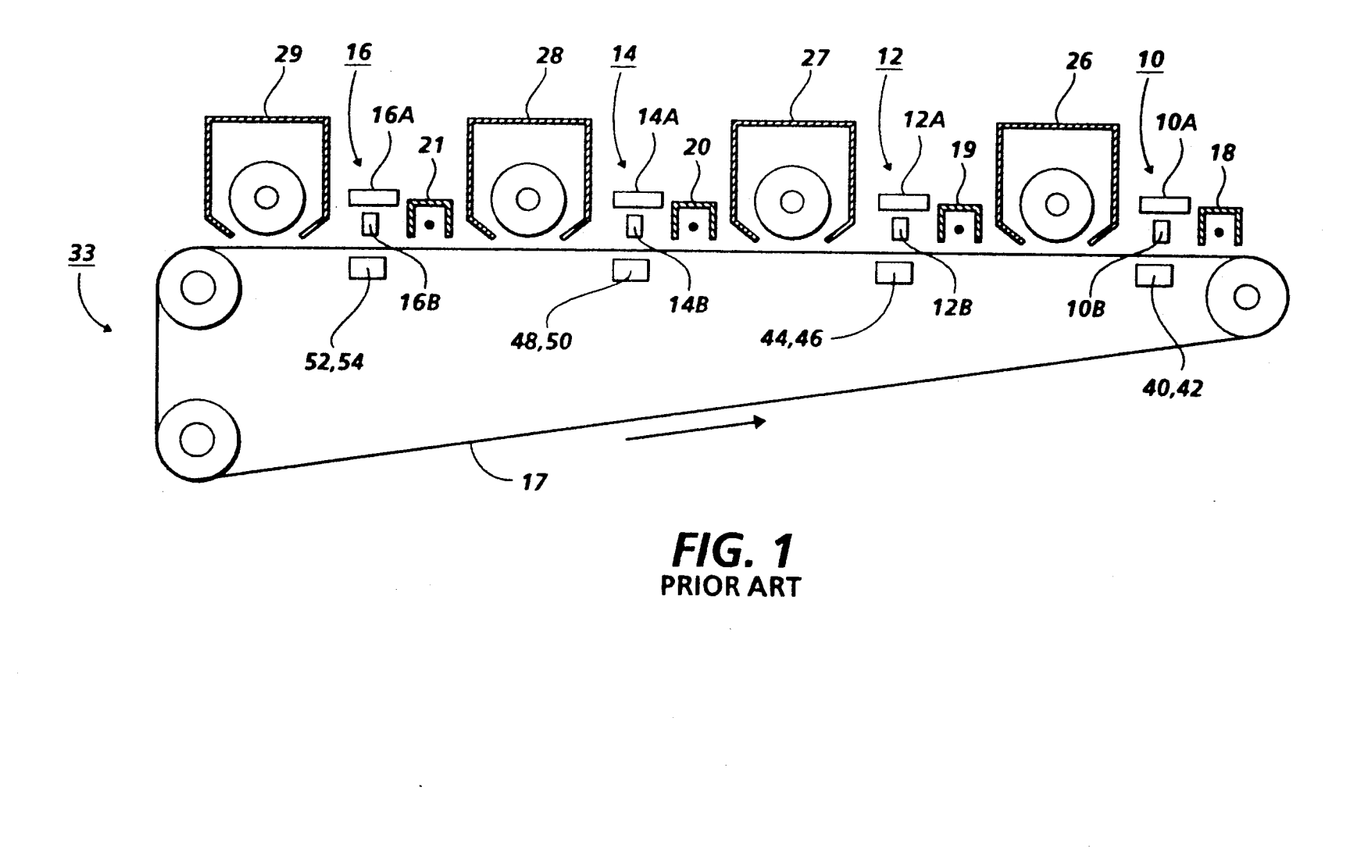
FIG. 1 is a side view of a prior art single pass LED image bar printer.
Figure 2:
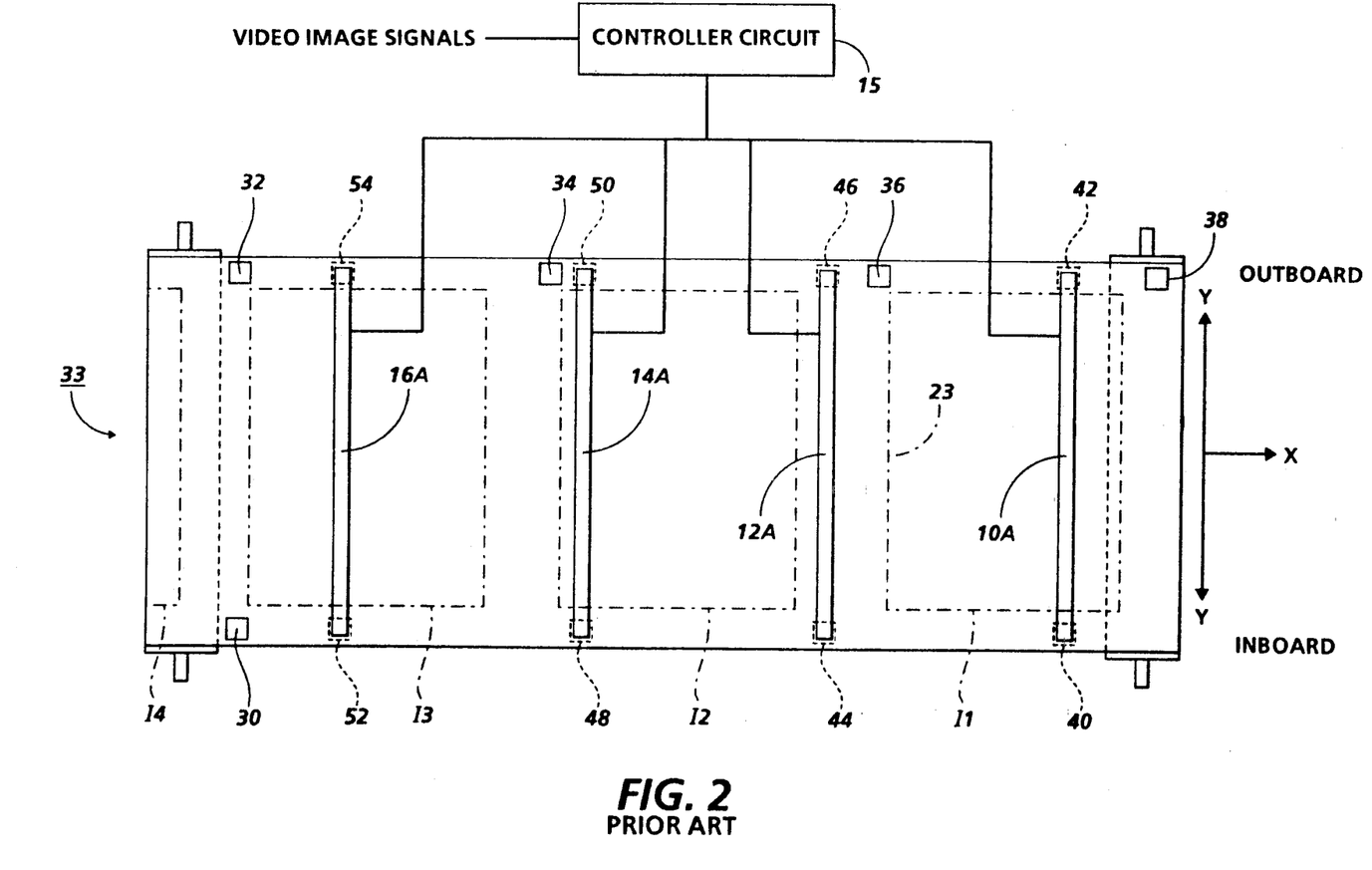
FIG. 2 is a top view of the printer of FIG. 1 omitting the xerographic stations excepting the exposure station.

FIG. 1 shows a side view of a prior art, single pass, color printing system having four exposure stations 10, 12, 14, 16, each station including an LED printbar 10A, 12A, 14A, 16A. FIG. 2 shows a top view of the system of FIG. 1 absent some of the xerographic stations, for ease of description. Each printbar is selectively addressed by video image signals processed through controller circuit 15, to produce a modulated output which is coupled through a gradient index lens array 10B, 12B, 14B, 16B, onto the surface of previously charged photoreceptor belt 17. The length of belt 17 is designed to accept an integral number of full page image areas; e.g. $I_1$-$I_4$, represented by dashed lines. Upstream of each exposure station are charge devices 18, 19, 20, 21, which place a predetermined electrical charge on the surface of belt 17. As the belt moves in the indicated direction, each image area moves past each of the printbars, with each bar providing its own exposure pattern, in response to the video data input. The exposure pattern begins when the leading edge of an image area reaches a transverse start-of-exposure line, represented in image frame $I_1$ by a line 23. The exposure pattern is formed of a plurality of closely spaced transverse scan lines. Downstream from each exposure station, a development system 26, 27, 28, 29, develops a latent image of the last exposure without disturbing previously developed images. A fully developed color image is then transferred at transfer station 33, by means not shown, to an output sheet. Further details of xerographic stations in a multiple exposure single pass system are disclosed in U.S. Pat. No. 4,660,059 and 4,833,503, whose contents are hereby incorporated by reference.

With such a system as that disclosed in FIGS. 1 and 2, each color image $I_1$-$I_4$ must be precisely aligned (registered) so that all corresponding pixels in the image areas are registered. Current requirements call for registration tolerances of approximately 20 microns. The printbar alignment requirements are for the pixels of each bar to be aligned in the transverse or Y-direction of FIG. 2, as well as the process or X-direction. This alignment must be maintained through continuous revolutions (passes) of the photoreceptor.

Continuing with the description of the system shown in FIGS. 1 and 2, a pair of inboard-outboard registration holes 30, 32 are provided at the beginning of one of the image frames. Additional holes 34, 36, 38 are located in an aligned row along the outboard end of the belt just upstream of the lead edge of an associated image frame. Fixed in place beneath each of the printbars are a pair of registration sensors, one at the inboard and one at the outboard end. Thus, printbar 10A has associated sensor pairs 40, 42, printbar 12A has sensor pairs 44, 46, printbar 14A, sensors 48, 50 and printbar 16A, sensors 52, 54. The sensors are used to detect the passage of holes 30, 32 coincident with the pulsing of predetermined pixels at the end of each image bar. Signals generated by each sensor pair are used to provide correction to the printbar to correct for skew registration errors and to align the bar in the transverse or scan direction. Sensors 42, 46, 50, 54 are also used to sense the passing of holes 32, 34, 36, 38 and enable precise energization of the associated printbar to form the lead edge scan line of each associated frame. Co-pending application U.S. Ser. No. 07/807,931, assigned to the same assignee as the present invention, discloses LED printbar registration techniques which utilize hole sensors to generate registration correction signals, which are used to drive stepper motors, which provide incremental rotational and transverse motion to an associated image bar. The contents of this application are hereby incorporated by reference.

In the prior art system, as disclosed in this co-pending '931 application, the sensors are typically simple interruptive optical switches consisting of an LED arranged so as to illuminate a phototransistor in a "U" shaped channel. These detectors, which also find use for locating belt holes associated with seams in a photoreceptor belt, have triggering requirements which are not very stringent. For example, a sensor XPN 130S892 will be triggered within ±500 μm (microns) of an optical center line, when an opaque mask (a belt portion with a hole therethrough) is slowly moved into the view of the sensor. Additionally, the sensor rise and fall times are specified to be less than approximately 600 μsec. (microseconds) and assuming, for example, that photoreceptor 17 is moving at a conventional velocity of 20 inches/sec., this translates into a triggering uncertainty of ±150 μm. This uncertainty is substantially greater than the ±20 μm registration requirement needed for color registration purposes in an LED color printer.

It is therefore an object of the present invention to improve the hole sensing mechanism used in prior art LED printers so that the accuracy of the detection is increased to that required to accurately register the lead edge of four color images. This object is realized by employing the LED printbar flux as the detector illumination means and by employing a PIN photodiode with a detection circuit which conditions the detector output signal to more precisely identify the edge transition position of the belt hole, as it passes into the view of the associated printbar sensor, thereby enabling more precise and repetitive location of each hole edge relative to the printbar exposure zone on the photoreceptor. More particularly, the present invention relates to an apparatus for forming multiple image exposure frames on a photoconductive member, moving in a process direction, during a single pass including:

a photoreceptor belt adapted to accommodate the formation of an integral number of image exposure frames, said belt having a first and second alignment aperture on opposite sides of the belt width and outside of the exposure frame, said aperture having a leading and trailing edge defined by the process direction, a plurality of linear image printbars, each printbar associated with the formation of one of said image exposure frames, each printbar having a central portion of light emitting pixels which are selectively activated to form said image exposure frames and at least one light emitting end pixel at each end and outside of said exposure frames which is selectively activated for printbar alignment and registration purposes, each printbar having a first and second detecting means said detecting means for detecting the light from said end pixels through said alignment apertures as the belt moves there past, said detecting means generating an output signal precisely defining the trailing edge of the alignment apertures, said detecting means comprising:

a photodetector which provides an output signal representing the activated end pixels as viewed through the boundaries of the leading and trailing edge of the alignment apertures, and a precision registration circuit which operates on said photodetector output signal to generate an output signal coincident in time with the trailing edge of said alignment apertures.

DETAILED DESCRIPTION OF THE INVENTION

Figure 3:
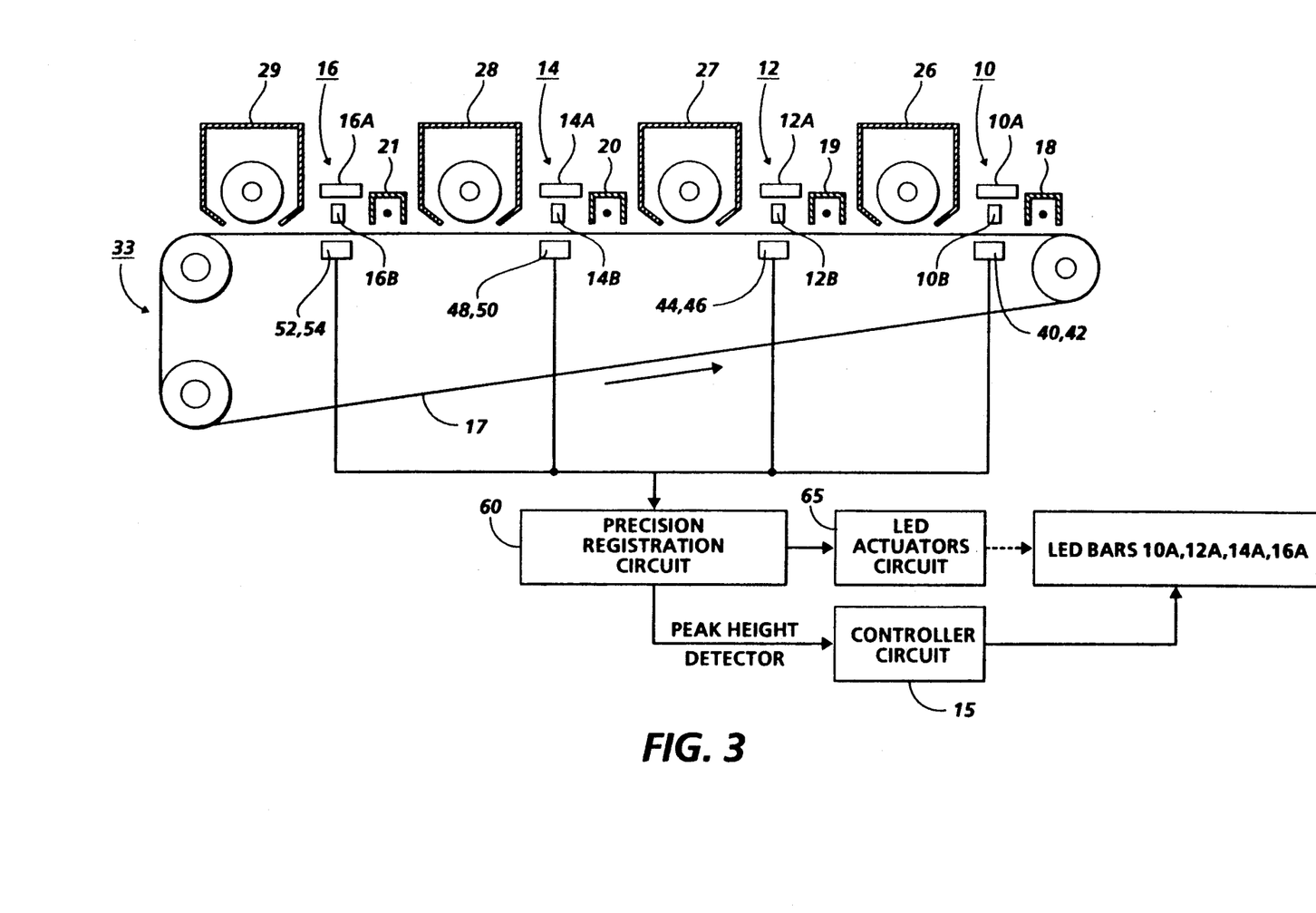
FIG. 3 is a side view of a printer of the type shown in FIGS. 1 and 2 modified by the addition of detection circuitry to increase the accuracy of the belt hole detection.
Figure 4:
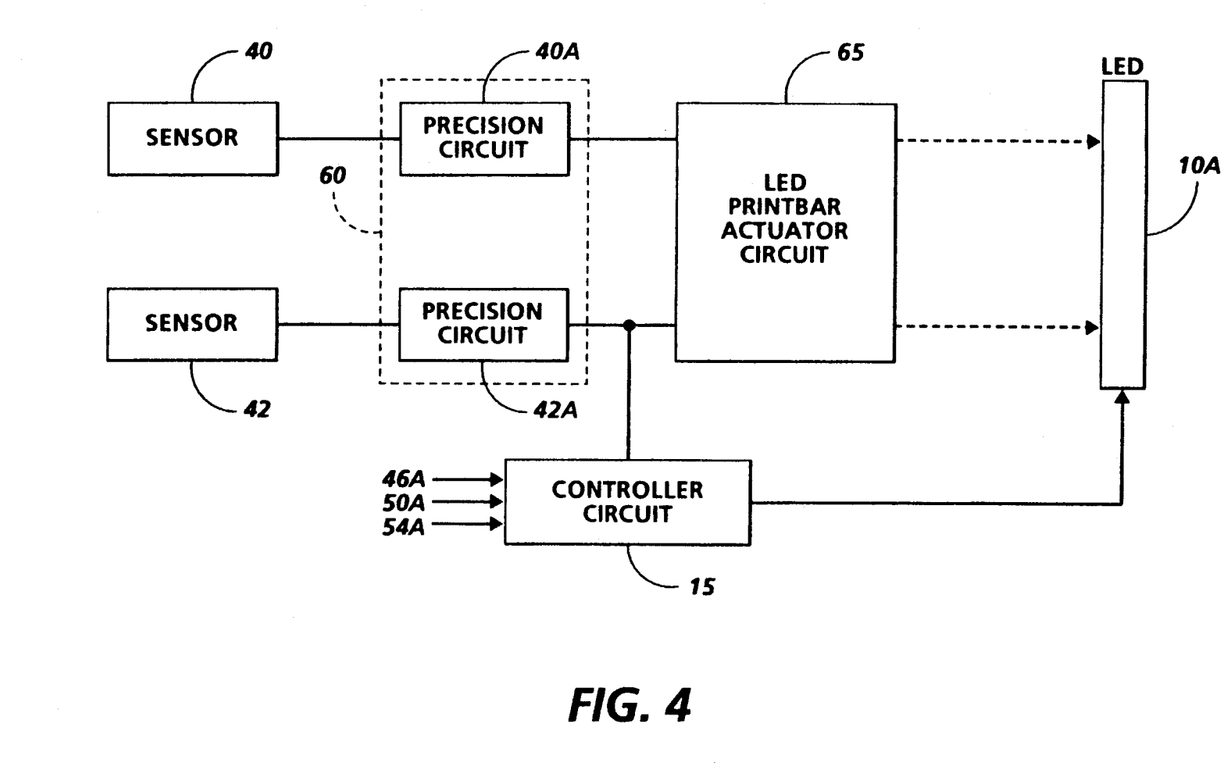
FIG. 4 is a block diagram showing the output of one pair of sensors connected to the detector circuitry shown in FIG. 3.
Figure 5A:
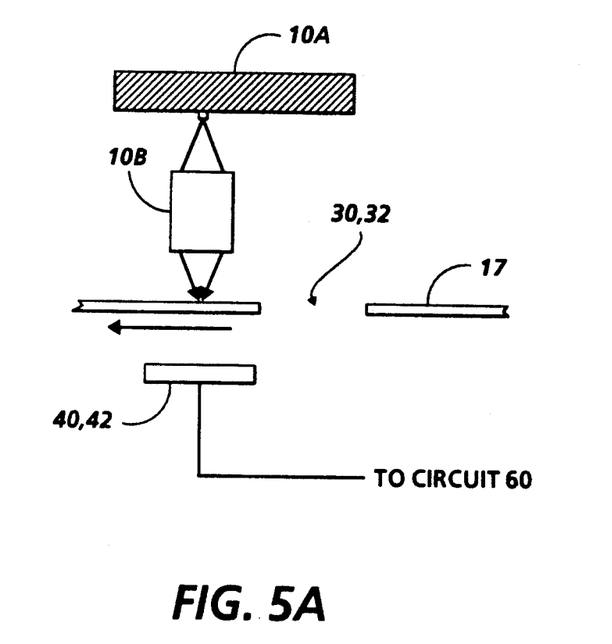
FIGS. 5A and 5B are side views of a belt hole detection sequence.
Figure 5B:
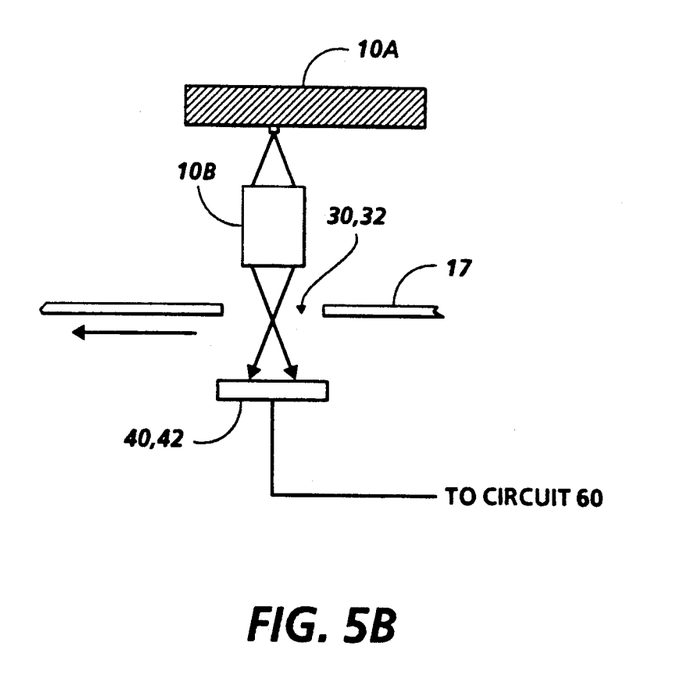
Figure 6:
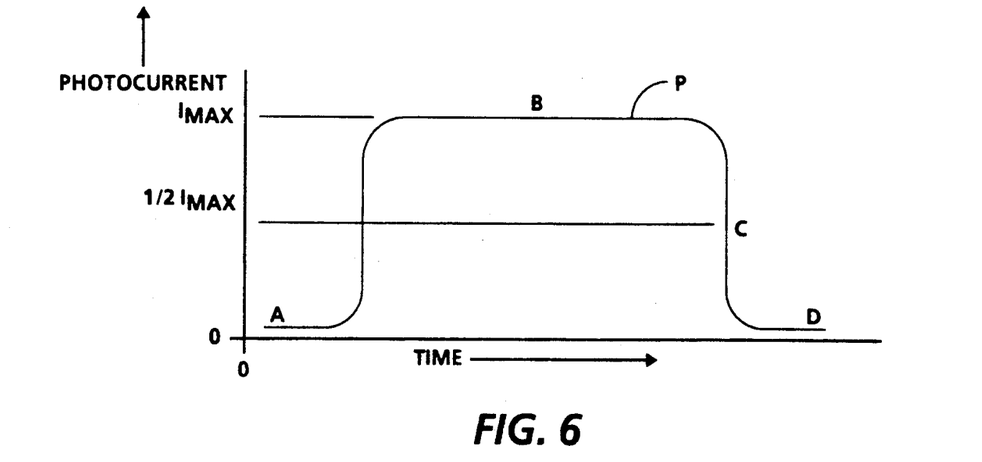
FIG. 6 shows a sensor photocurrent pulse output.
Figures 7A, 7B, 7C:
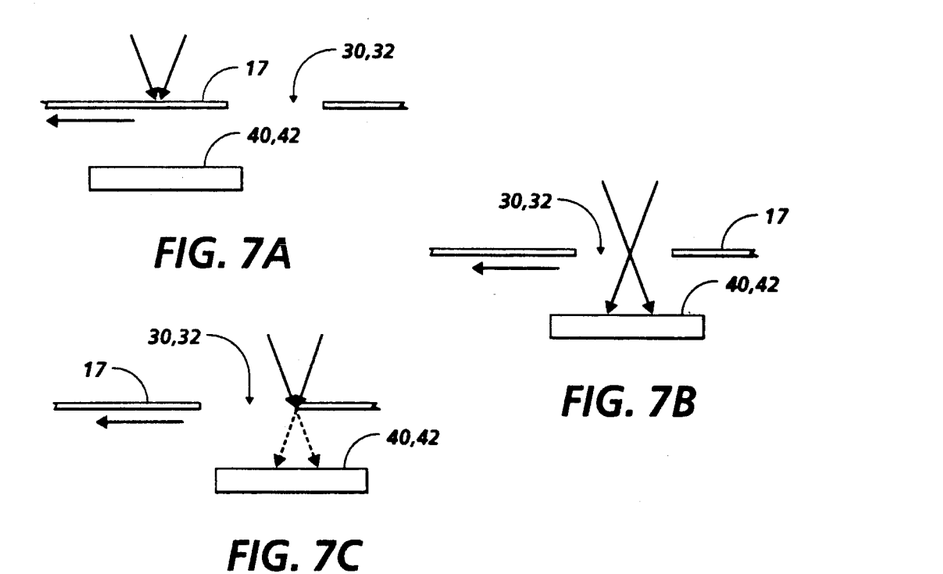
FIGS. 7A, 7B, 7C, 7D show various belt hole location positions referenced to the FIG. 7 shows the various belt hole location positions tied into the pulse output shown in FIG. 6.
Figure 7D:
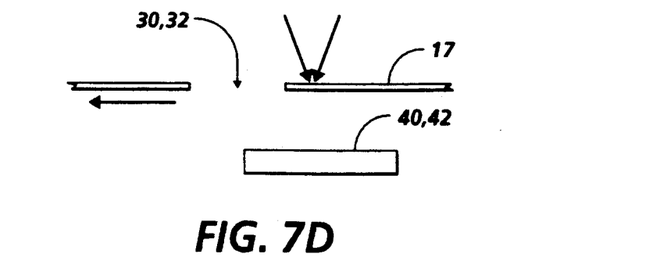

Referring now to FIG. 3, there is shown the printer of FIGS. 1 and 2 modified, according to the present invention, by the addition of registration circuit 60 connected to the outputs of the sensor pairs. Circuit 60 comprises a plurality of individual circuits connected to the outputs of each of the sensors 40–54. FIG. 4 shows precision circuits 40A, 42A. It is understood that the remaining sensor pairs 44, 46; 48, 50; and 52, 54 are connected to associated circuits 44A, 46A; 48A, 50A; 52A, 54A, respectively, and are identical in operation. The outputs from circuit 60 are DC waveform signals which are used in LED actuator circuit 65 to generate drive signals for an actuator, such as a stepper motor, to provide the corrections to the associated LED printbar to correct for skew and transverse registration errors. These detector circuits 40A–54A are identical and each circuit incorporates a signal amplifying and peak height detecting means to more precisely identify belt hole transitions as the belt moves past the detectors (hole edge sensing as described in further detail below). Assuming that the belt motion is in the process direction shown in FIG. 3, belt hole pairs 30, 32 will pass under the edges of each of the LED bars once each cycle or pass. If the ends of each printbar are illuminated by, for example, one or more designated printbar pixels, light from the designated end pixels will be periodically visible through the holes 30, 32 and sensed by the sensor pair associated with each printbar. As shown in FIG. 5, the flux from the lighted pixels at the ends of, for example, bar 10A are collected by lens array 10B and focused onto the plane of photoreceptor 17, along a scan direction (into the page), as shown in FIG. 5A. At the edge of the belt, holes 30 and 32 are located. The photoreceptor is generally blackened in the area adjacent the holes so that when the belt obstructs the viewing nip (FIG. 5A) virtually no light is transmitted through the belt. As the belt progresses, holes 30, 32 come within the viewing nip (FIG. 5B) and flux from the end pixels of bar 10A pass through and illuminate detectors 40, 42. For this example, the detectors 40–42 are low cost PIN photodiodes. Dynamically, this results in a brief pulse of photo induced current in the photodiode which is used for the detection. FIG. 6 shows the formation of photocurrent pulse P as a function of time and with reference to the four sequential locations A, B, C, D, of the belt hole pairs 30, 32, as shown in FIGS. 7A, 7B, 7C, and 7D.

Figure 8:
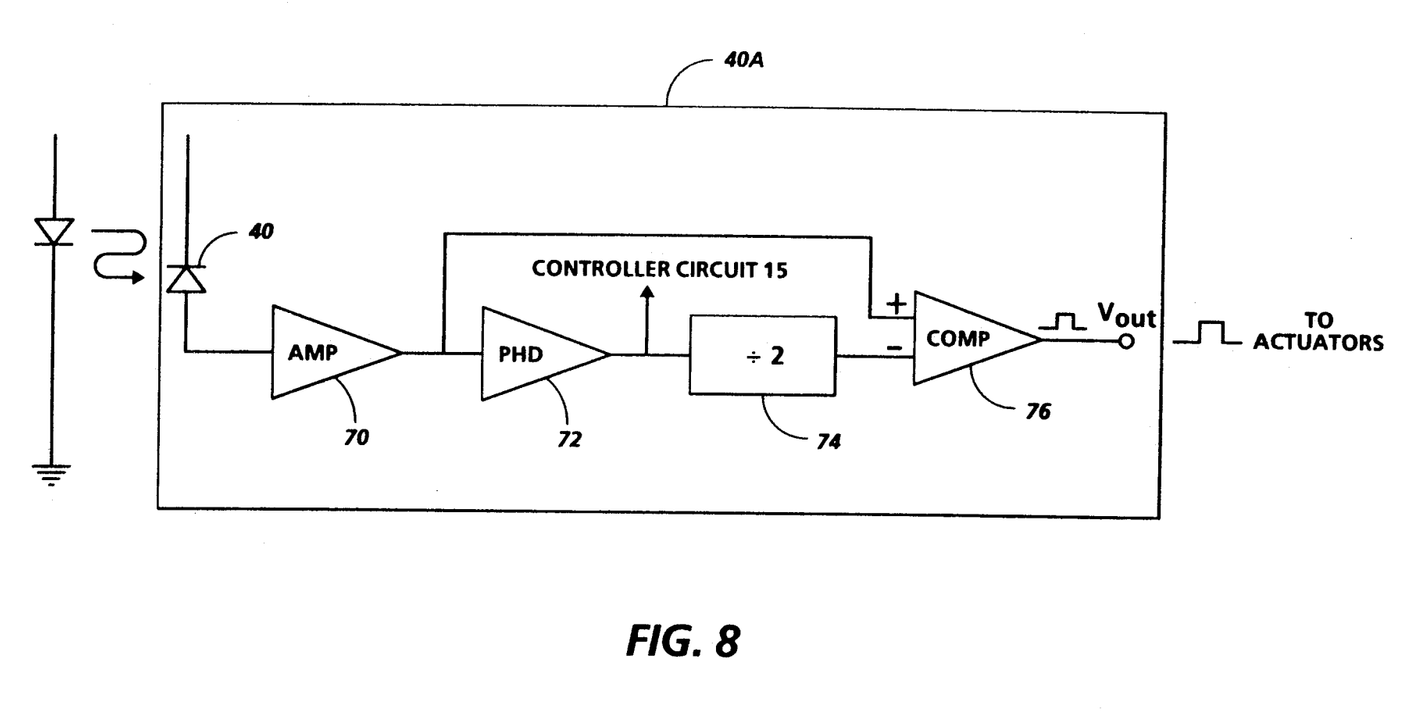
FIG. 8 is a block diagram of a precision belt hole sensing circuit.
Figure 9:
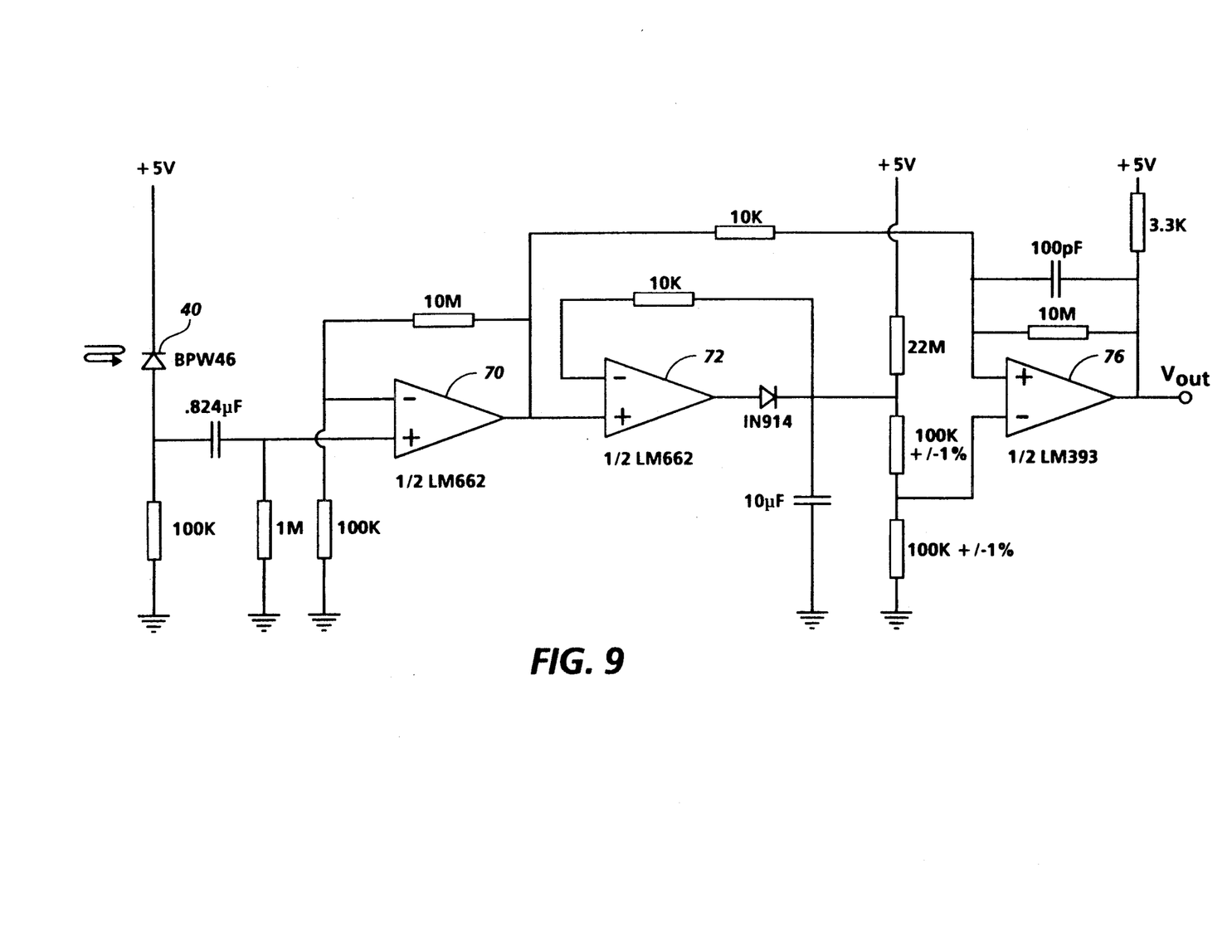
FIG. 9 provides further details of the circuit diagram of FIG. 8.

According to the present invention, and as shown in FIGS. 8 and 9, precision belt hole sensing circuits 40A, 42A are connected to the output of sensors 40, 42 to produce a more precise output signal which is used to drive an actuator (not shown) which produces the mechanical changes in printbar orientation to correct for the misregistration errors. FIG. 8 is a block diagram of the detecting circuitry for an exemplary circuit 40A and FIG. 9 is a detailed circuit design. It is understood circuit 40A is identical in operation to circuits 42A–54A. Referring to FIG. 8, the photo induced current from detector 40 is fed to a fast transconductance amplifier 70, which produces a square voltage pulse output whose amplitude is proportional to the magnitude of the induced flux. The peak is captured and held by a peak height detector 72, whose output decays slowly with respect to the "real time" pulse. The peak height detector output is divided by two in circuit 74 and this value is applied to the negative input of a voltage comparitor 76. The positive input is fed by the output of the amplifier 70. Thus, when the trail edge of the hole 30, 32 cuts the light beam (FIG. 7C) and reduces the flux to one half of its peak value, the comparitor 76 will change state from high to low. This transition value (½ max value C in FIG. 6) is used to precisely and repetitively locate the trail edge of holes 30, 32, relative to the aeriel image zone of printbar 10A because it is independent of flux level, contamination state of the optical components, gain of the amplifier circuitry, and photoreceptor belt speed, thus assuring both the sensor to sensor and within sensor repeatability that enables the registration. Thus, the output signals from circuits 40A, 42A, as shown in FIG. 4, are sent to circuit 65 where a comparison is made of the waveforms. If the waveforms are not coincident in time (indicating that a skew correction is needed), a suitable signal is sent to an actuator associated with one end of each of the LED bars, to impart a controlled movement to the printbar ends, until the skew error is corrected.

The above skew alignment procedure is repeated for the remaining printbars 12A, 14A, 16A, advancing the same aperture pair, 30, 32, into alignment with the next printbar pixel illuminated end. Each printbar is then aligned in the same manner, each printbar having associated stepper motors or other alignment means. At the end of the initial alignment, all printbars are aligned with respect to the aperture pair and corrected for skew. Each trailing edge of each of the image frame holes 32, 34, 36, 38, are also very precisely defined by the output of circuits 42A, 46A, 50A, and 54A. These outputs are sent to controller circuit 15. Circuit 15 generates a print signal to the associated LED bar and the writing of the image at the lead edge of the associated image frame will commence, following a finite time interval. This time interval image will be the same for all the image bars, since the exact midpoint position of the zone associated with each bar is being sensed.

Referring now to FIG. 9, there is shown a diagram of the block circuit used to demonstrate the feasibility of the concept. A 660 nm, 300 spi printbar 10A was made operational in a fixture and used to optimize the circuit parameters and components. The detector 40 was a 2.7 mm × 2.7 mm PIN photodiode manufactured by Telefunken GmBH, part # BPW 46, and was chosen for its speed, size, availability, and suitability to the task. The detector and circuitry were co-located on a Proto Board equipped with a ground back plane and cover for RFI and EMI pickup avoidance, and the assembly was mounted in such a way that detector 40 was positioned to receive an end pixel output from the printbar. The photocurrent output from sensor 40 was dropped directly to ground across a 100K ohm resistor to create a voltage, which was amplified and buffered by a 10× non-inverting voltage amplifier 70. 100K ohms was chosen as a good tradeoff point between signal level and response time, and the amplifier gain was chosen to yield around 1.5 volts of signal with one LED pixel lit. This level allowed the investigation of triggering behavior with one, two, and three end pixels providing the diode illumination. To increase both carrier collection efficiency and speed, the photodiode 40 was reverse biased to +5 volts. The peak height detection stage 72 was designed so as to decay to around 40% of its peak value in ½ second. This value is set by the 10 uF capacitor in parallel with 2 100K ohm resistors and corresponds to a photoreceptor belt speed of 20 inches/sec with one frame approximately every 10''. The two 100K ohm resistors also perform the divide by two function and the 10M ohm resistor insures that the comparitor 76 output stays low in the event of prolonged absence of signal, such as when the photoreceptor is stopped. The comparitors negative input is fed by ½ the peak detector output and the positive by the amplifier 70 output. The registration signal occurs when the amplifier 70 output falls to ½ of its peak value and causes the comparitor 76 to quickly transition from high to low, which in this circuit is 5 volts to 0 volts. The operation of the circuit of FIG. 8 was observed by using a dual beam oscilloscope trace of the outputs of the amplifier 70, the peak height detector 72, and the amplifier 76 with one, two, or three end pixels of the printbar illuminated. It was observed that the comparitor output generally follows that of the amplifier with both going high when flux is applied to the diode and both going low when flux is removed. It was also seen that the peak height detector output rises to the amplifier peak output value and holds that value when the pulse is removed. For the case of one, two, and three pixels lit, the triggering at the trail edge is summarized in Table A.

The registration shifts were calculated by assuming a photoreceptor belt speed 20 inches/second. Faster and slower speeds would scale proportionally. Since the registration goal is to register all colors to approximately ±20 μm, the technique of the present invention offers a more precise realization of this precision registration than is available in the prior art, e.g. ±150 μm to ±500 μm. For the cases of fall times ranging from 211 to 36 usec., triggering at the trail edge of the pulse was measured from the 90% to the 10% points on the waveform. These fall times correspond to a range of photoreceptor speeds of 16 to 96 inches/sec with an 84 μm printing pixel size or 8 to 48 inches/sec., with a 42 μm pixel. Table B summarizes the results.

TABLE A

| # of LED Pixels Lit | Peak Signal (volts) | Trigger Signal (volts) | Comparitor Delay (uSec) | Registration Shifts at 20 inches/sec. | |
|---|---|---|---|---|---|
| | | | | Absolute (um) | Relative (um) |
| 1 | 1.5 | 0.75 | 3.0 | 1.5 | 0.2 |
| 2 | 2.9 | 1.45 | 2.8 | 1.4 | 0.1 |
| 3 | 4.0 | 2.00 | 1.8 | 0.9 | −0.4 |

TABLE B

| Fall Time (uSec) | Comparitor Delay (uSec) | Registration Shifts at 20 inches/sec. | |
|---|---|---|---|
| | | Absolute (um) | Relative (um) |
| 211 | 10.0 | 5.0 | 1.2 |
| 95 | 7.5 | 3.6 | −0.2 |
| 36 | 5.4 | 2.7 | −1.1 |

As seen in the Tables, the amount of shift in registration signals is small when compared to the ±20 μm goal and appeared to vary less than ±1 usec. cycle to cycle for fixed test conditions. As a further feature of the present invention, it has been recognized that the signals from the peak height detector 72, in FIG. 8, are useful to monitor the performance of sensors 40–54. As the sensors efficiency degrades during operation as, for example, due to build-up of optical contaminants such as toner and paper dust or degradation of LED printbar pixel output, the signal level from detector 72 would reflect this sensor degradation. The output of detector 72 is, therefore, sent to controller 15 (FIG. 3), which includes a comparison circuit, which compares the pulse height detector output to a reference signal representing optimum detection performance. Upon reaching a predetermined detection level, a signal is sent to the associated LED bar to increase the output flux level by predetermined amounts. The signals from the peak height detector are also used to alert service personnel by a visual display, or the like, that sensor replacement or cleaning is required.

While the invention has been described with reference to the structures disclosed, it is not confined to the details set forth, but is intended to cover such modifications or changes as they come within the scope of the following claims. for example, while a 50% flux attenuation point C was selected as a triggering value, using a divide by two circuit, other attenuation points may be selected with appropriate changes in the circuitry, as is known to those skilled in the art. Also, while apertures were used, transparent windows may also be used, consistent with the principles of the present invention. Also, while a four color, single pass printing system has been used to illustrate the concept, it will be realized that the principles described herein are likewise applicable to the alignment and triggering of a single LED printbar in a multi-pass printing system.

What is claimed is:

1. A method for improving image registration of a photoreceptor belt moving in a process direction comprising the steps of:

forming an aperture in the belt in a non-image exposure edge area of the belt, positioning at least one linear image printbar in image forming position with respect to the belt, said print bar having at least one row of linearly extending light emitting pixels, including a central pixel grouping used to write successive image lines on charged portions of the belt and end pixels emitting radiation outside the imaging area, moving the belt until radiation from the end pixels is detected through said aperture by photodetecting means for detecting said radiation positioned beneath said end pixels, said photodetecting means providing an output signal having an amplitude proportional to a level of said radiation emanating from said pixels, amplifying the photodetecting means output signal, generating a signal representing the peak height of said amplified signal, dividing the peak height signal, applying the divided signal to a first input of a comparator, and applying the amplified photodetecting means output signals to a second input of a comparator, the comparator changing state when the amplified signal level corresponding to detection of the trailing edge of the aperture falls to the level of the divided signal applied to the first input.

2. An apparatus for forming image exposure frames on the surface of a photoconductive member moving in a process direction, the apparatus including:

a photoreceptor belt adapted to accommodate the formation of said image exposure frames, said belt having at least one aperture formed outside of said exposure frame, said aperture having a leading and trailing edge defined by the process direction, at least one linear image print bar associated with the formation of said image exposure frames, each at least one said print bar having a central portion of light emitting pixels which are selectively activated to form said image exposure frames and at least one light emitting end pixel outside of said exposure frames which is selectively activated for printbar alignment and registration purposes, a photosensor for generating a photocurrent output pulse which rises from zero to a maximum value as the leading edge of the aperture passes into view and falls back to zero when the trailing edge of the aperture passes into view, a comparator for producing an output signal coincident in time with detection of said trailing edge, amplifying means for amplifying said photocurrent output pulse to produce a square wave output voltage signal, said output signal applied to one input of said comparator and a second signal applied to a peak height detector and divide down circuit, a peak height detector and divide down circuit for generating and maintaining a transition value output signal which is applied to a other input of said comparator, the comparator changing state and producing an output signal when the amplified signal input level falls to the transition value during the time when the trailing edge of the aperture passes into view of the photosensor.

3. The imaging system of claim 2 wherein said belt includes a plurality of apertures in process direction alignment along one edge, said apertures located prior to the lead edges of an associated image exposure frame, and wherein said comparator output signals are edge sync signals which enable printbar operation at a following specific time interval.

4. The apparatus of claim 2 further including means for rotating said printbar in response to output signals generated by said comparator.

* * * * *